US011232003B1

(12) United States Patent
Chinmay et al.

(10) Patent No.: US 11,232,003 B1
(45) Date of Patent: Jan. 25, 2022

(54) METHOD AND APPARATUS FOR ACCESSING AT LEAST ONE MEMORY REGION OF SSD DURING FAILOVER SITUATION IN MULTIPATH SYSTEM

(71) Applicant: SAMSUNG ELECTRONICS CO., LTD., Suwon-si (KR)

(72) Inventors: Chirag Chinmay, Bengaluru (IN); Muthazhagan Balasubramani, Bengaluru (IN); Venkataratnam Nimmagadda, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/197,289

(22) Filed: Mar. 10, 2021

(30) Foreign Application Priority Data

Dec. 16, 2020 (IN) .............................. 202041054814

(51) Int. Cl.
*G06F 11/20* (2006.01)
(52) U.S. Cl.
CPC ........ *G06F 11/201* (2013.01); *G06F 2201/85* (2013.01)
(58) Field of Classification Search
CPC ............. G06F 11/2023; G06F 11/2033; G06F 11/2053; G06F 11/2071; G06F 2201/85; G06F 3/0607; G06F 3/0617; G06F 11/2005; G06F 11/201; G06F 11/2017; G06F 11/2043; G06F 11/2046; G06F 11/2092; G06F 11/2097
See application file for complete search history.

(56) References Cited

U.S. PATENT DOCUMENTS

| 7,085,883 B1* | 8/2006 | Dalgic | G06F 3/0617 |
| | | | 711/114 |
| 2013/0007512 A1* | 1/2013 | Amin | G06F 11/2033 |
| | | | 714/10 |
| 2014/0244936 A1* | 8/2014 | Maharana | G06F 11/14 |
| | | | 711/135 |
| 2015/0143164 A1* | 5/2015 | Veerla | G06F 11/2023 |
| | | | 714/6.3 |
| 2019/0324683 A1* | 10/2019 | Li | G06F 3/0658 |

OTHER PUBLICATIONS

Andrey Kudryavtsev, "An Introduction To Dual-Port NVMe SSD.", IT Peer Network, Mar. 31, 2016, 6 pages total.
"Achieving NVMe Shared Storage with E8's HA NVMe Enclosure and Intel Datacenter SSD", intel, 2016, 4 pages total.
Sneha Nadig, "Testing Dual-Port NVMe SSD", Flash Memory Summit, Aug. 2018, 23 pages total.

* cited by examiner

*Primary Examiner* — Matthew M Kim
*Assistant Examiner* — Kurosu Risa Altaf
(74) *Attorney, Agent, or Firm* — Sughrue Mion, PLLC

(57) ABSTRACT

A first host system in a multipath storage system acts on behalf of a second host system when the second host system is unable to access a solid state drive (SSD). The first host system configures a bitmap table using an SSD controller of the first host system to access memory of the SSD associated with the second host system. The memory accessed on behalf of the second host system may be in a region including persistent memory, base address register memory and/or controller memory buffer of the second host system.

12 Claims, 7 Drawing Sheets

CROSS PMR/CMB ACCESS ENABLE

METHOD AND APPARATUS FOR ACCESSING AT LEAST ONE MEMORY REGION OF SSD DURING FAILOVER SITUATION IN MULTIPATH SYSTEM

CROSS-REFERENCE TO RELATED APPLICATIONS

This application claims benefit of priority, under 35 U.S.C. § 119, to Indian Patent Application No. 202041054814 filed on Dec. 16, 2020 in the Indian Patent Office; the contents of the above application is hereby incorporated by reference herein.

FIELD

The present disclosure relates to a storage media devices having Dynamic Random Access Memory (DRAM) regions, and more specifically related to a method and apparatus for accessing at least one memory region of a Solid State Drive (SSD) during a failover situation in a multipath system.

BACKGROUND

In data centers, a multipath storage system may provide an alternative method of accessing data during a failover in one particular path. However, there is no alternative method during a failover of accessing the data from a memory region like but not limited to a Persistent Memory Region (PMR)/Controller Memory Buffer (CMB) region. FIG. 1 illustrates an architecture where a first host system accesses its own PMR/CMB region in the multipath storage system. There is no existing system and method where the first host system accesses a PMR/CMB region of at least one second host system. For example, the first host does not access the PMR/CMB of the second host when the second host system is unable to access its own PMR/CMB region due to its physical access failure with Non-Volatile Memory Express Solid State Drive (NVMe-SSD).

FIG. 2 is a flow diagram (2000) illustrating a method for accessing a namespace region in the multipath storage system, according to a prior art disclosed herein.

The method includes, at operation 202, a second host system informs a first host system about its physical access failure with SSD, using its own propriety method. At operation 204 the first host system sends a Namespace attachment command to its controller to attach the second host system's namespace to its controller. At operation 206, first host system controller receives the command, and updates its controller to include reference to the second host system's namespace in the namespace mapping table. At operation 208, the method includes any further read or write command. The first host system prepares the read or write command with the second host system's Namespace ID. At operation 210, it is emphasized that the first host system must set the appropriate Namespace ID in the read or write command.

According to the related art, in a multipath system, during failover situation, a namespace can be accessed across multiple hosts but not across memory regions.

Thus, it is desired to address the above mentioned disadvantages or other shortcomings or at least provide a useful alternative.

SUMMARY

An aspect of one or more embodiments is to provide a method and apparatus for accessing at least one memory region of a Solid State Drive (SSD) during failover situation in a Multipath system.

Another aspect of one or more embodiments is to receive a message from a second host system in a multipath storage system, where the message indicates start accessing at least one memory region of at least one SSD controller from plurality of SSD controllers associated with the second host system.

Another aspect of one or more embodiments is to create at least one vendor specific command to access the at least one memory region of the at least one SSD controller from the plurality of SSD controllers associated with the second host system.

Another aspect of one or more embodiments is to send the at least one vendor specific command to at least one SSD controller from plurality of SSD controllers associated with a first host system to modify a bitmap of the SSD Controller which comprises of mapping between unique controller identifiers and base address register of the controller from the at least one SSD controller from plurality of SSD controllers associated with the second host system.

Another aspect of one or more embodiments is to redirect at least one of a read or a write packet received from the second host system to access the at least one memory region of the at least one SSD controller from the plurality of SSD controllers associated with the second host system based on the updated Bitmap.

Another aspect of one or more embodiments is to receive a message from the second host system, where the message indicates stop accessing the at least one memory region of the at least one SSD controller from the plurality of SSD controllers associated with the second host system.

Another aspect of one or more embodiments is to create at least one vendor specific command to stop accessing the at least one memory region of the at least one SSD controller from the plurality of SSD controllers associated with the second host system via the updated bitmap also containing the unique identifier of the SSD Controller.

Another aspect of one or more embodiments is to send the at least one vendor specific command to the SSD controller from the plurality of SSD controllers connected to the first host system.

Another aspect of one or more embodiments is to modify the bitmap of the SSD Controller which comprises of mapping between unique controller identifiers and base address register of the controller from the plurality of SSD controllers associated with the first host system.

According to an aspect of an example embodiment, there is provided a method for accessing at least one memory region of at least one Solid State Drive (SSD) including a plurality of SSD controllers, wherein the plurality SSD controllers include a first SSD controller associated with a first host system in a multipath storage system and a second SSD controller in the multipath storage system, the second SSD controller is associated with a second host system, and the at least one memory region is associated with the second SSD controller, the method including: receiving, by the first host system, a message from the second host system during an access failure; sending, by the first host system, at least one vendor specific command to the first SSD controller to modify a bitmap of the first SSD Controller; modifying, by the first SSD controller, the bitmap; and redirecting, by the first host system, at least one of a read packet or a write packet received from the second host system to access the at least one memory region based on the modified bitmap.

According to an aspect of an example embodiment, there is provided an apparatus for accessing at least one memory region of at least one Solid State Drive (SSD) having a plurality of SSD controllers, implementing the method of stated above.

According to an aspect of an example embodiment, there is provided a first host system in a multipath storage system for accessing at least one memory region of at least one Solid State Drive (SSD) including a plurality of SSD controllers, wherein the plurality of SSD controllers include a first SSD controller associated with the first host system in the multipath storage system and a second SSD controller in the multipath storage system, and the second SSD controller is associated with a second host system, the first host system including: a processor; and a memory, wherein the processor is configured to execute instructions stored in the memory to provide a host-controller interface by: receiving, by the first host system, a message from the second host system during an access failure; sending, by the first host system, at least one vendor specific command to the first SSD controller to modify a bitmap of the first SSD Controller; and redirecting, by the first host system, at least one of a read packet or a write packet received from the second host system to access the at least one memory region of the second SSD controller based on the modified bitmap.

The above and other aspects of the embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Various changes and modifications may be made within the scope of the embodiments herein without departing from the spirit thereof, and the embodiments herein include all such modifications.

BRIEF DESCRIPTION OF THE DRAWINGS

Example embodiments will be more clearly understood from the following brief description taken in conjunction with the accompanying drawings, in which.

DETAILED DESCRIPTION

Figure 1:
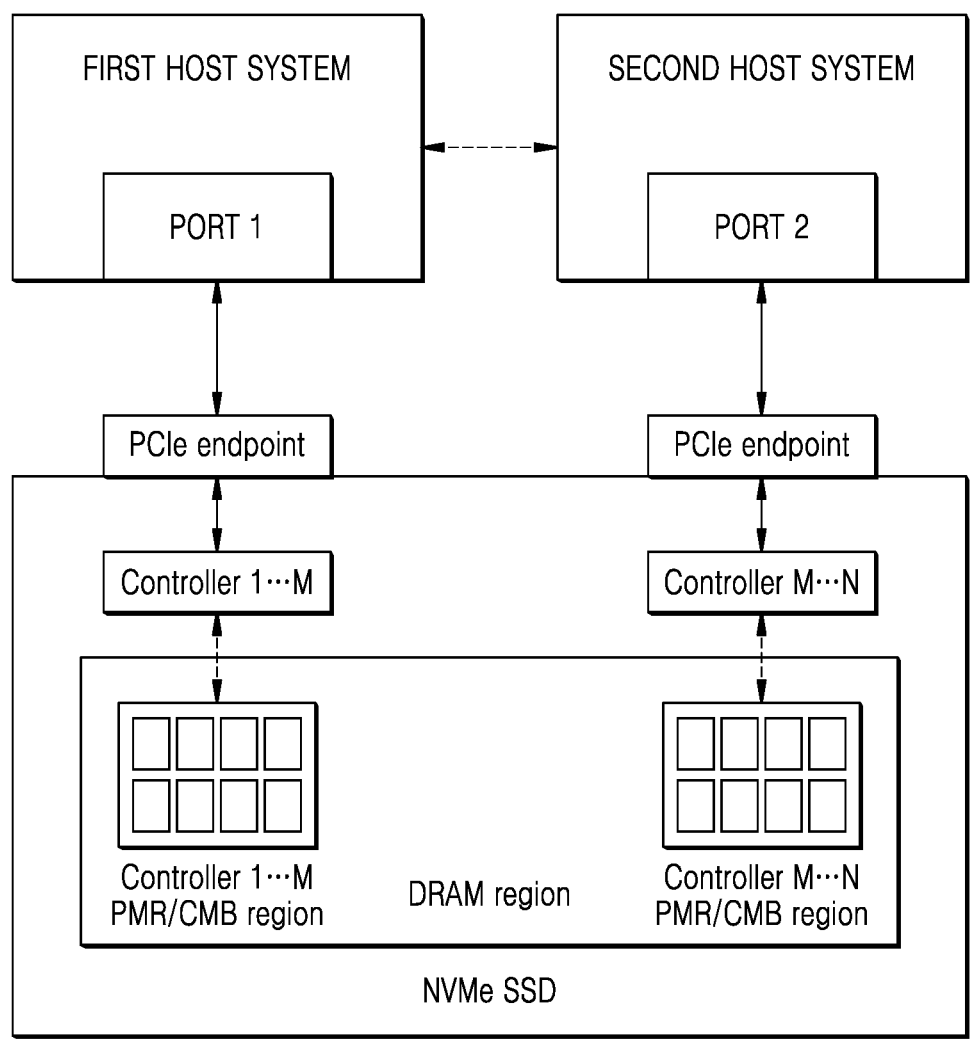
FIG. 1 illustrates an existing architecture where a first host system accesses its own a Persistent Memory Region (PMR)/Controller Memory Buffer (CMB) region in a multipath storage system, according to related art.
Figure 2:
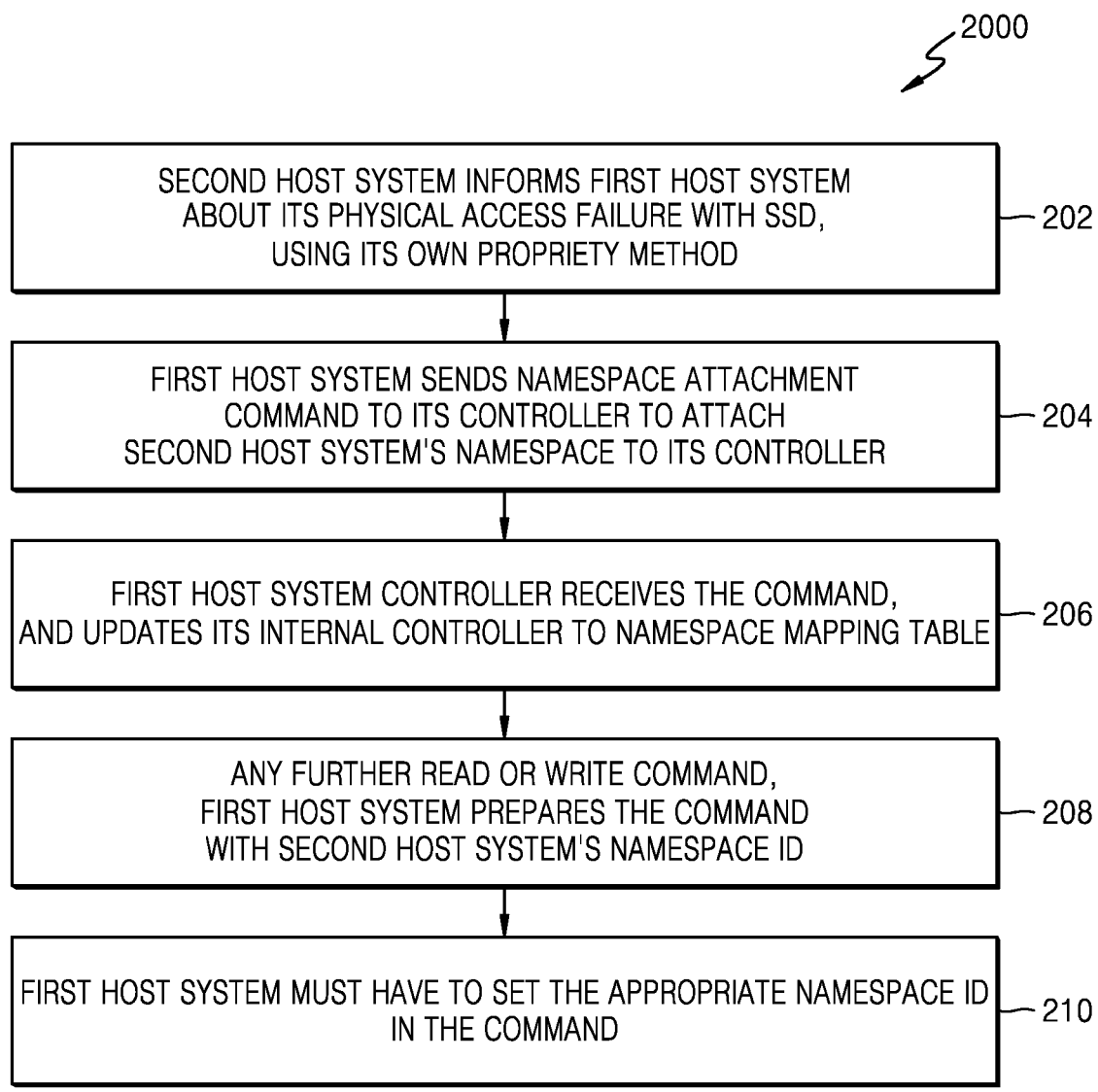
FIG. 2 is a flow diagram illustrating a method for accessing a namespace in the multipath storage system, according to related art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described system or systems. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the application disclosure. Likewise, the blocks of the embodiments may be physically combined into more complex blocks without departing from the scope of the application disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method and apparatus for accessing at least one memory region of a Solid State Drive (SSD) during failover situation in a Multipath system. The method includes receiving, by a first host system, a message from a second host system in a multipath storage system, where the message indicates start accessing at least one memory region of at least one SSD controller from plurality of SSD controllers associated with the second host system. Further, the method includes creating, by the first host system, at least one vendor specific command to access the at least one memory region of the at least one SSD controller from the plurality of SSD controllers associated with the second host system. Further, the method includes sending, by the first host system, the at least one vendor specific command to at least one SSD controller from plurality of SSD controllers associated with the first host system to modify a bitmap of the SSD Controller which comprises of mapping between unique controller identifiers and base address register of the controller from the at least one SSD controller from plurality of SSD controllers associated with the second host system. Further, the method includes redirecting, by the SSD controller, at least one of a read or a write packet received from the second host system to access the at least one memory region of the at least one SSD controller from the plurality of SSD controllers associated with the second host system based on the updated Bitmap.

Example embodiments will now be described with reference to FIGS. 3A through 4.

Figure 3A:
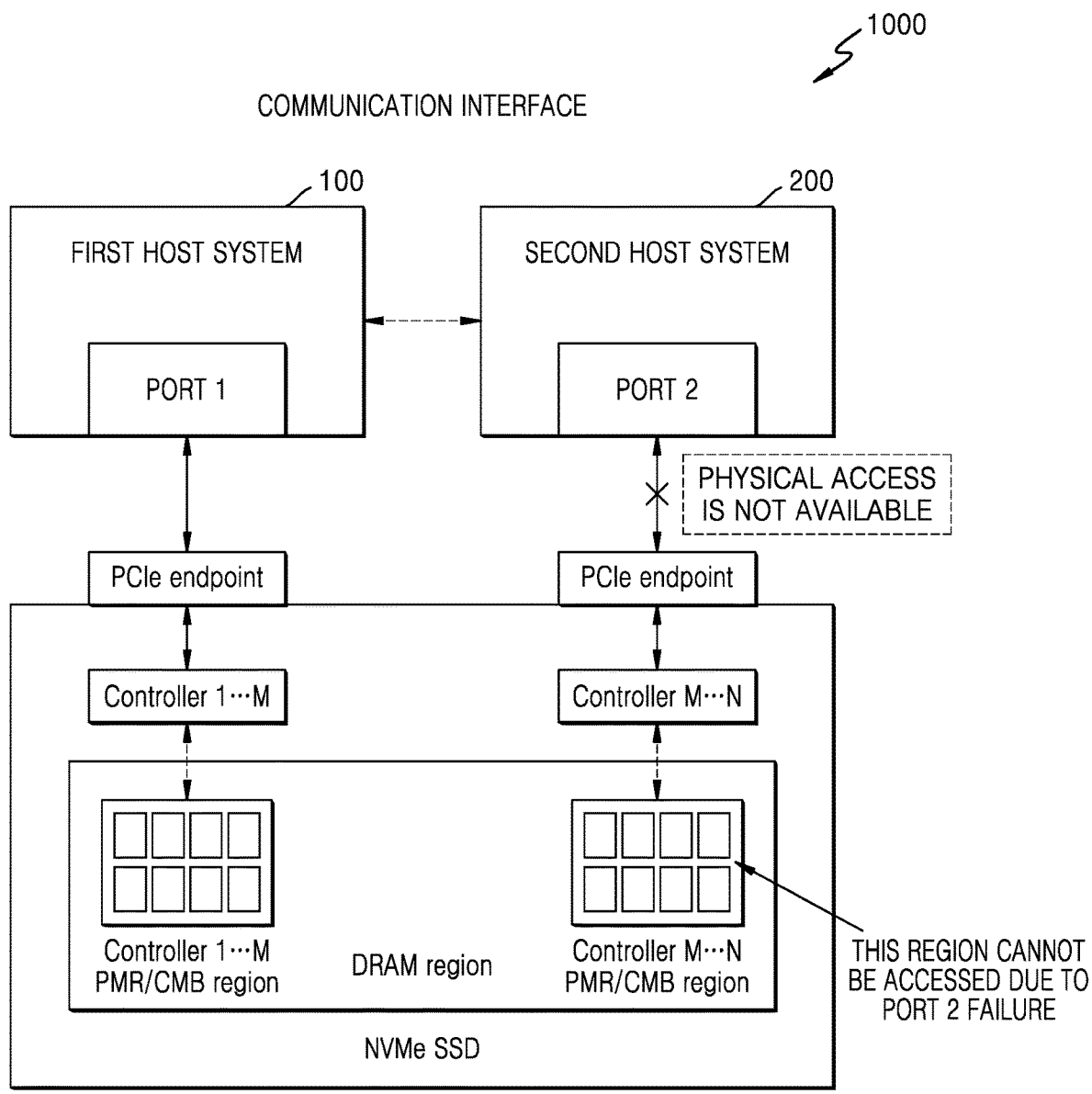
FIGS. 3A, 3B and 3C illustrate a proposed architecture where the first host system accesses a PMR/CMB region of a second host system when the second host system fails to access its own PMR/CMB region in the multipath storage system, according to an embodiment.
Figure 3B:
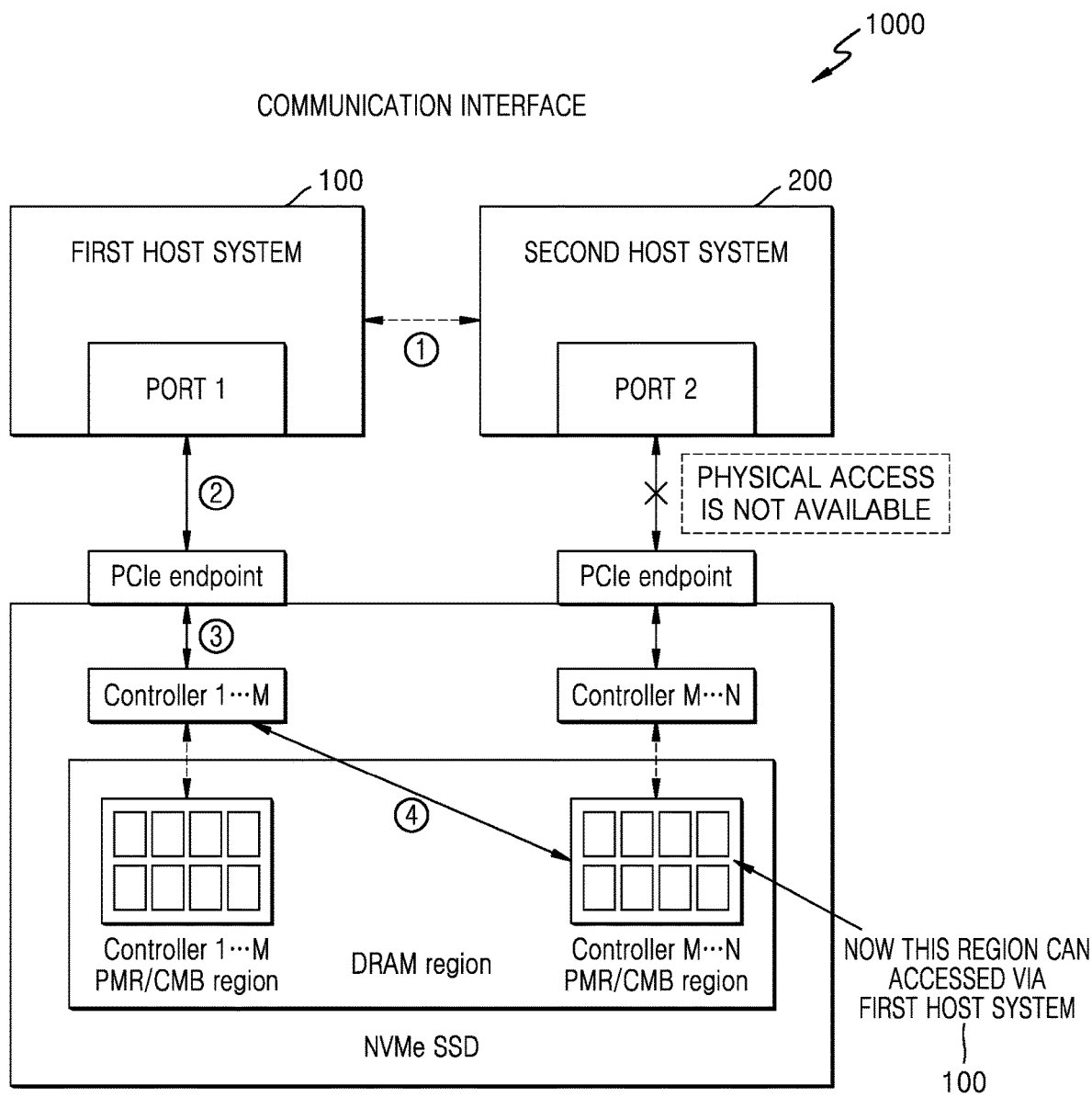
Figure 3C:
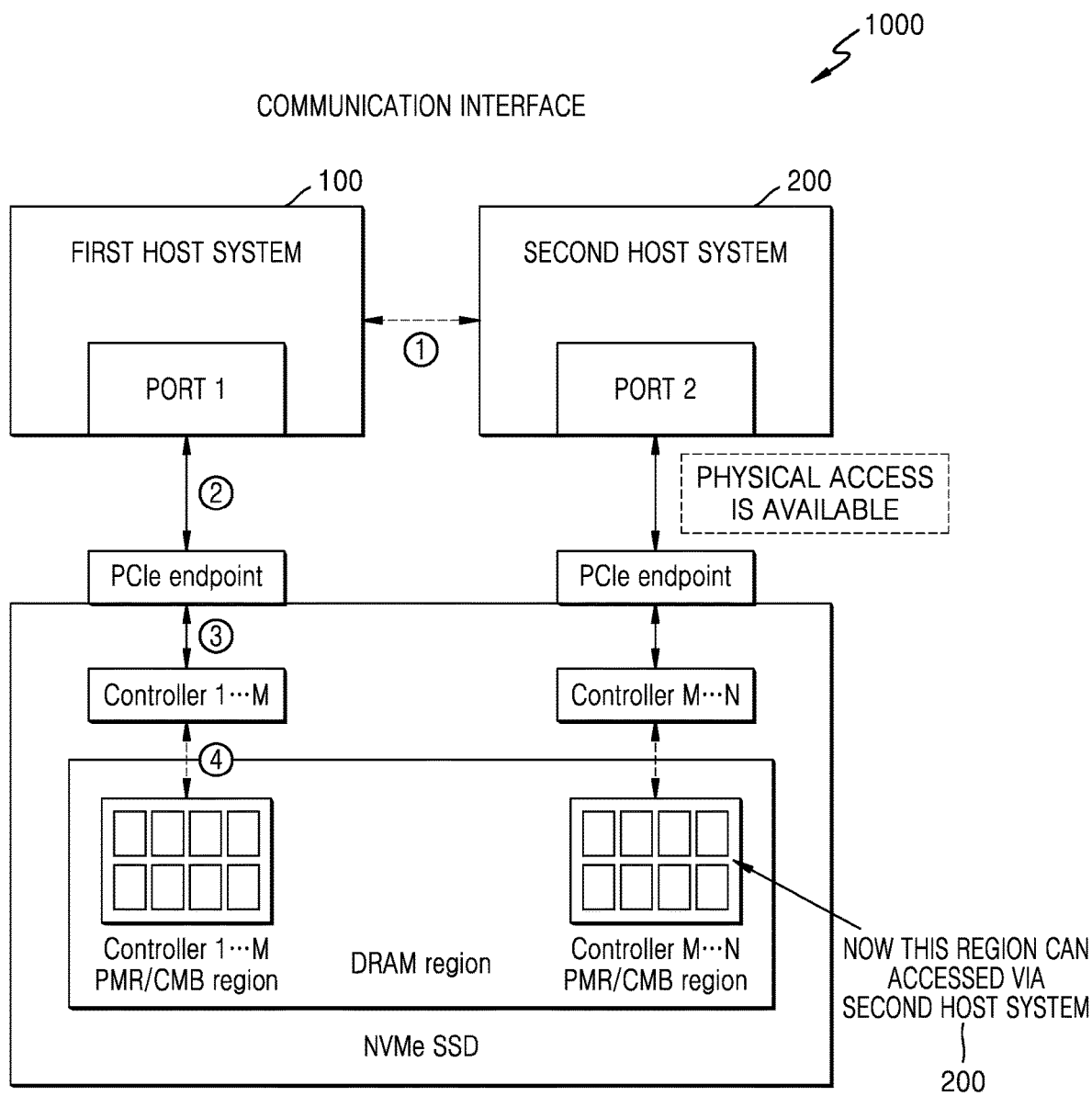

FIGS. 3A, 3B and 3C illustrate an architecture where a first host system 100 accesses a PMR/CMB region of a second host system 200 when the second host system 200 fails to access its own PMR/CMB region in a multipath storage system 1000, according to an example embodiment. In an example embodiment, the multipath storage system 1000 includes the first host system 100 and the second host system 200. The multipath storage system 1000 may also have more than one host group for the same functionality which is proposed between the first host system 100 and the second host system 200. The first host system 100 and the second host system 200 is an example of a Non-Volatile Memory Express (NVMe) host.

In FIG. 3A, the second host system 200 fails to access its own PMR/CMB region in the multipath storage system 1000.

In FIG. 3B, the first host system 100 is configured to receive a message from the second host system 200 in the multipath storage system 1000, where the message indicates start accessing at least one memory region of at least one SSD controller from plurality of SSD controllers associated with the second host system (refer notation '①'). Further, the first host system 100 is configured to create at least one vendor specific command to access the at least one memory region of the at least one SSD controller from the plurality of SSD controllers associated with the second host system 200. Further, the first host system 100 is configured to send the at least one vendor specific command to at least one SSD controller from the plurality of SSD controllers associated with the first host system 100 to modify a bitmap of the SSD Controller which comprises a mapping between unique controller identifiers and base address register of the controller from the at least one SSD controller from plurality of SSD controllers associated with the second host system 200 (refer notation '②' and '③'). Further, the SSD controller is configured to automatically redirect at least one of a read or a write packet received from the first host system 100 to access the at least one memory region of the at least one SSD controller from the plurality of SSD controllers associated with the second host system 200 based on the updated Bitmap (refer notation '④').

In FIG. 3C, the first host system 100 is configured to receive a message from the second host system 200, where the message indicates stop accessing the at least one memory region of the at least one SSD controller from the plurality of SSD controllers associated with the second host system 200 (refer notation '①'). Further, the first host system 100 is configured to create at least one vendor specific command to stop accessing the at least one memory region of the at least one SSD controller from the plurality of SSD controllers associated with the second host system 200 via the updated bitmap also containing the unique identifier of the SSD Controller. Further, the first host system 100 is configured to send the at least one vendor specific command to the SSD controller from the plurality of SSD controllers connected to the first host system 100 (refer notation '②' and '③'). Further, the first host system 100 is configured to modify the bitmap of the SSD Controller which comprises of mapping between unique controller identifiers and base address register of the controller from the plurality of SSD controllers associated with the first host system 100 (refer notation '④').

Figure 4A:
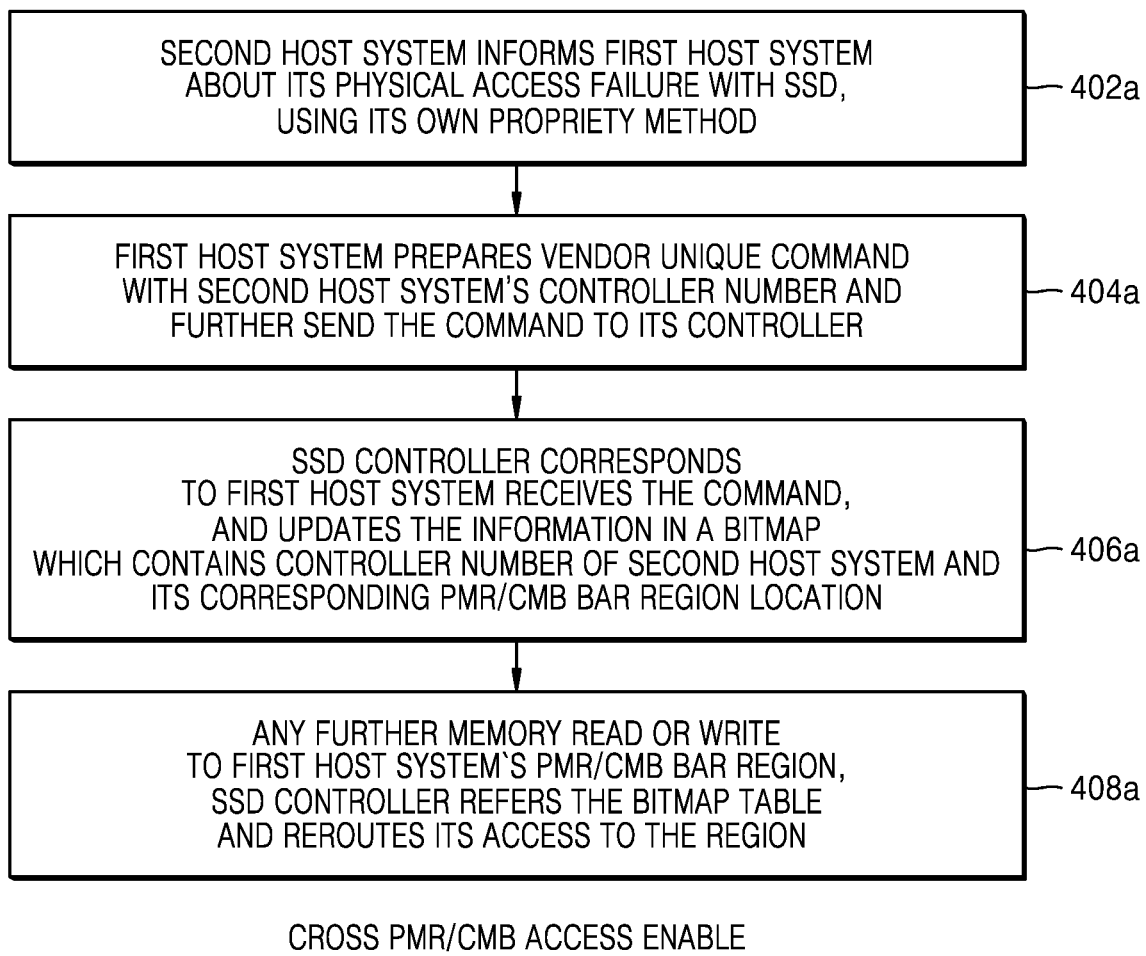
FIGS. 4A and 4B are flow diagrams illustrating a method for enabling or disabling cross PMR/CMB region access in the multipath storage system, according to an embodiment.
Figure 4B:
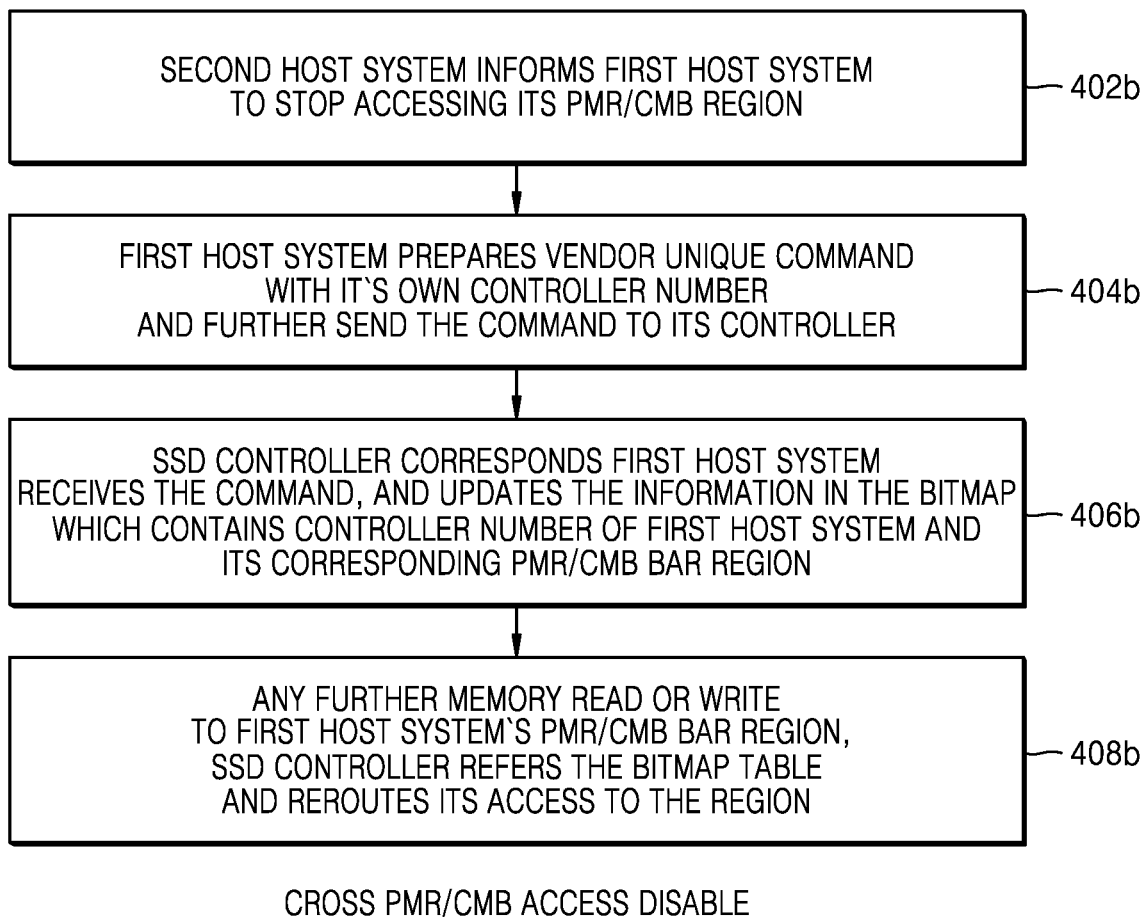

FIGS. 4A and 4B are flow diagrams illustrating a method for enabling or disabling cross PMR/CMB region access in the multipath storage system 1000, according to an example embodiment.

In the FIG. 4A, the notation 'a' of operations 402a through 408a indicates a method for enabling cross PMR/CMB region access. At operation 402a, the second host system 200 informs the first host system 100 about its physical access failure with SSD, using its own propriety method. At operation 404a, the first host system 100 prepares vendor unique command with the controller number of the second host system 200 controller number and further send the command to the SSD controller corresponds to first host system. At operation 406a, the SSD Controller corresponds to first host system 100 receives the command and updates the information in a Bitmap which contains controller number of the second host system 200 and its corresponding PMR/CMB base address register (BAR) region. At 408a, any further memory read or write to the PMR/CMB BAR region of the first host system 100, SSD Controller refers the BitMap and reroutes its access to the region.

In the FIG. 4B, the notation 'b' of operations 402b through 408b indicates a method for disabling cross PMR/CMB region access. At 402b, the method includes that the second host system 200 that informs the first host system 100 to stop accessing its PMR/CMB region. At 404b, the method includes that the first host system 100 prepares a vendor unique command with its own controller number and further sends the command to its controller. At 406b, the method includes that the SSD Controller corresponds to first host system 100 receives the command and updates the information in the Bitmap which contains controller number of the first host system 100 and its corresponding PMR/CMB BAR region. At 408b, the method includes that any further memory read or write to the PMR/CMB BAR region of the first host system, the SSD Controller corresponds to first host system 100 refers the BitMap and reroutes its access to the region.

The embodiments disclosed herein can be implemented using at least one software program stored on a non-transitory computer readable recording medium and executed by at least one hardware processor device to perform network management functions to control the elements.

The foregoing description of the example embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the spirit and scope of the embodiments as described herein.

What is claimed is:

1. A method for accessing at least one memory region of at least one Solid State Drive (SSD) including a plurality of SSD controllers, wherein the plurality of SSD controllers include a first SSD controller associated with a first host system in a multipath storage system and a second SSD controller in the multipath storage system, the second SSD controller is associated with a second host system, and the at least one memory region is associated with the second SSD controller, the method comprising:
   receiving, by the first host system, a message from the second host system during an access failure;
   sending, by the first host system, at least one vendor specific command to the first SSD controller to modify a bitmap of the first SSD Controller;
   modifying, by the first SSD controller, the bitmap; and
   redirecting, by the first host system, at least one of a read packet or a write packet received from the second host system to access the at least one memory region based on the modified bitmap.

2. The method of claim 1, wherein the at least one vendor specific command is configured to permit the first host system to access the at least one memory region.

3. The method of claim 1, further comprising detecting, by the second host system, the access failure.

4. The method of claim 1, wherein the modifying comprises updating the bitmap to map between a unique controller identifier and a base address register of the second SSD controller.

5. The method of claim 4, further comprising:
   receiving, by the first host system, a second message from the second host system, wherein the second message is configured to cause the first host system to stop accessing the at least one memory region;
   creating, by the first host system, at least one second vendor specific command configured to cause the first SSD controller to stop accessing, via the modified bitmap, the at least one memory region;
   sending, by the first host system, the at least one second vendor specific command to the first SSD controller; and
   modifying, by the first SSD controller, the bitmap associated with the first host system.

6. The method of claim 5, wherein the at least one second vendor specific command comprises a unique identifier associated with the first SSD controller.

7. The method of claim 1, wherein the first host system is configured to, responsive to the message, access the at least one memory region.

8. The method of claim 1, wherein the at least one vendor specific command comprises a unique identifier associated with the second SSD controller.

9. The method of claim 1, wherein the at least one memory region comprises at least one of a Persistent Memory Region (PMR) or a Controller Memory Buffer (CMB) region.

10. The method of claim 9, wherein the at least one memory region comprises a base address register (BAR) memory.

11. An apparatus for accessing at least one memory region of at least one Solid State Drive (SSD) having a plurality of SSD controllers, implementing the method of claim 1.

12. A first host system in a multipath storage system for accessing at least one memory region of at least one Solid State Drive (SSD) including a plurality of SSD controllers, wherein the plurality of SSD controllers includes a first SSD controller associated with the first host system in the multipath storage system and a second SSD controller in the multipath storage system, and the second SSD controller is associated with a second host system, the first host system comprises:
   a processor; and
   a memory,
   wherein the processor is configured to execute instructions stored in the memory to provide a host-controller interface by:
      receiving, by the first host system, a message from the second host system during an access failure;
      sending, by the first host system, at least one vendor specific command to the first SSD controller to modify a bitmap of the first SSD Controller; and
      redirecting, by the first host system, at least one of a read packet or a write packet received from the second host system to access the at least one memory region of the second SSD controller based on the modified bitmap.

* * * * *